United States Patent
Wood et al.

(10) Patent No.: US 7,355,179 B1
(45) Date of Patent: Apr. 8, 2008

(54) SCENE IMAGING SYSTEM INTEGRITY MONITOR AND METHOD THEREOF

(75) Inventors: Robert B. Wood, Beaverton, OR (US); John G. Wilson, West Linn, OR (US); Kenneth A. Zimmerman, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 285 days.

(21) Appl. No.: 11/192,794

(22) Filed: Jul. 30, 2005

(51) Int. Cl.
*G01J 5/02* (2006.01)
(52) U.S. Cl. .................................. 250/339.11
(58) Field of Classification Search ............ 250/339.11
See application file for complete search history.

(56) References Cited

U.S. PATENT DOCUMENTS

| | | | |
|---|---|---|---|
| 5,361,307 A * | 11/1994 | Hartley et al. ............ | 382/278 |
| 6,373,055 B1 | 4/2002 | Kerr | |
| 6,806,469 B2 | 10/2004 | Kerr | |
| 2002/0088951 A1 * | 7/2002 | Chen ........................ | 250/548 |
| 2004/0169617 A1 | 9/2004 | Yelton | |
| 2004/0169663 A1 | 9/2004 | Bernier | |
| 2004/0201768 A1 * | 10/2004 | Cahill et al. ............... | 348/335 |
| 2005/0007261 A1 | 1/2005 | Berson | |

* cited by examiner

*Primary Examiner*—David Porta
*Assistant Examiner*—Mindy Vu
(74) *Attorney, Agent, or Firm*—Nathan O. Jensen; Kyle Eppele

(57) ABSTRACT

A scene imaging system (SIS) integrity monitor for monitoring the required operation of an imaging sensor of an SIS. The SIS is of a type including: i) an imaging sensor, ii) an imaging system processor, and iii) an imaging system display. The SIS integrity monitor includes a signal emitter assembly for receiving emitter drive signals from an imaging system processor and directing a monitoring image into the active field of view of an imaging sensor for sensed image generation. The generated image is provided to the imaging system processor for analysis. The imaging system processor evaluates the location and modulation state of the generated image to determine if faults exist in the image generation or image display paths.

20 Claims, 5 Drawing Sheets

SCENE IMAGING SYSTEM INTEGRITY MONITOR AND METHOD THEREOF

BACKGROUND OF THE INVENTION

1. Field of the Invention

The present invention relates to scene imaging systems and more particularly to a monitoring system for monitoring the required operation of an imaging sensor of the scene imaging system. The present monitoring system has particular application relative to monitoring an Enhanced Vision System (EVS) of an aircraft.

2. Description of the Related Art

Many devices, such as aircraft, are typically designed to provide a real-world view of the out-the-window scene for at least one operator to operate the device. In the past, a view of the scenery outside the device was provided through passive means, such as a cockpit windshield, or artificial means through sensors and displays.

Enhanced Vision Systems (EVS) supplement out-the-window vision via the use of camera/sensor imagery superimposed over the real-world view. EVS include sensors that can detect and display images of objects that pilots would not normally be able to see when looking through the cockpit window of an aircraft. For example, EVS can present data from sensors that can penetrate low-visibility weather conditions and darkness, such as radar or forward-looking infrared (FLIR). The data presented from the sensors is derived from the current environment and not from a computer database. EVS can be used on both head-down and head-up displays. Other features such as navigation enhancements and proactive systems to avoid controlled flight into terrain and runway incursions can also be integrated in EVS.

To achieve lower minima landing credit using an Infrared (IR) based EVS system, the integrity of both the IR sensor and display device (e.g., a Head Up Guidance System) must meet minimal integrity requirements based on the function being performed. To qualify for use during low visibility operations, the EVS Sensor and image fusion processor of the Head Up Guidance System (HGS) computer must not have any failure modes which would result in a hazardous failure condition for the aircraft. Therefore, a monitor may be required to independently monitor the sensor output for certain faults. The monitor must be designed to assure that no hazardous failure mode is undetected.

To achieve this level of integrity, the hardware must meet minimum Mean Time Between Failures (MTBF) and Built In Test (BIT) coverage requirements, and the software/firmware must be developed with a process that provides the appropriate level of integrity assurance. The issue that often arises in the development process, if a process was followed at all, is due to minimal or nonexistent design and design and performance assurance documentation. Either, portions of the development process must be performed again to establish this documentation, or monitoring techniques must be employed in the system which externally assures the required performance of the system and, therefore, alleviates the need for certain design documentation.

As will be disclosed below, the present invention provides a means to externally monitor the integrity of the EVS Sensor. The monitor is developed to an integrity level adequate to meet the end-to-end system requirements. It obviates the need to develop the EVS Sensor software/firmware to a specific avionics assurance level, and allows COTS software/firmware to be used without modification. This reduces the overall development costs and provides wider options in terms of sensor selections.

SUMMARY OF THE INVENTION

In a broad aspect, the present invention is a scene imaging system (SIS) integrity monitor for monitoring the required operation of an imaging sensor of an SIS. The SIS is of a type including: i) an imaging sensor, ii) an imaging system processor, and iii) an imaging system display. The SIS integrity monitor includes a signal emitter assembly for receiving emitter drive signals from an imaging system processor and directing a monitoring image into the active field of view of an imaging sensor for sensed image generation. The generated image is provided to the imaging system processor for analysis. The imaging system processor evaluates the location and modulation state of the generated image to determine if faults exist in the image generation or image display paths.

The advantage of this invention is that it allows for the assurance of the required operation of certain SIS functions through partially external means while not relying completely on SIS built-in test functions. In this instance, the SIS imaging sensor is allowed to operate normally without being forced into a special test state, while a test object is artificially introduced into the sensed image of the SIS imaging sensor. The test object, while controlled by the SIS, is generated from a source which is external to the SIS imaging sensor and, therefore, appears in the sensed image as any other object of the normal scene would. Detection, or the lack thereof, of the test object within a normally processed image defines the required operation of the SIS. Therefore, this monitoring technique allows the monitoring apparatus and functions to be added to the SIS without any modification to the SIS imaging sensor.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
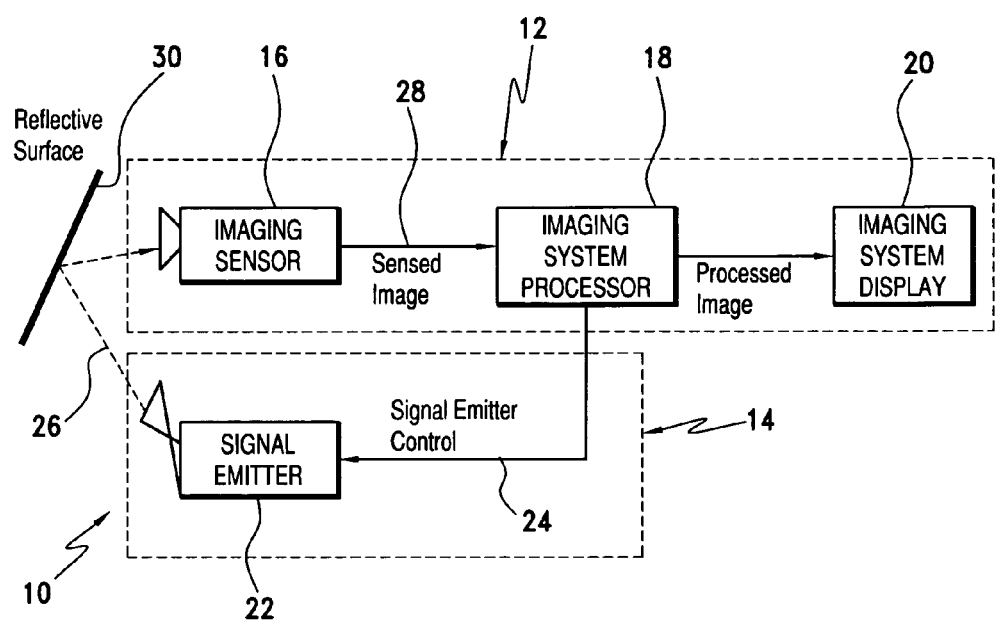
FIG. 1 is a block diagram illustrating the scene imaging/integrity monitoring system of the present invention.

Referring now to the drawings and the characters of reference marked thereon, FIG. 1 illustrates a scene imaging/integrity monitoring (SI/IM) system 10 of the present invention. The SI/IM system 10 includes a scene imaging system (SIS) 12 and a scene imaging system (SIS) integrity monitor 14. The SIS 12 includes an imaging sensor 16, an imaging system processor 18, and an imaging system display 20. The SIS 12 may be for, example, an enhanced vision system (EVS) and include any number of scene imaging sensors, e.g. visible light, infrared, millimeter-wave radar, X-band (weather) radar, etc. Other types of SIS's may include, for example surveillance systems, fire detection systems, and imaging systems used for automated parts assembly.

The SIS integrity monitor 14 includes a signal emitter assembly 22 for receiving emitter drive signals 24 from the imaging system processor 18 and directs a monitoring image 26 into the active field of view of the imaging sensor 16 for sensed image generation. The generated image 28 is provided to the imaging system processor 18 for analysis. The imaging system processor 18 evaluates the location and modulation state of the signal emitter assembly 14 to determine if faults exist in the image generation or image display paths, as will be explained in detail below. The modulation state is the rate at which the signal emitter assembly 22 is activated and deactivated. The signal emitter assembly 22 operates in a real time, continuous manner.

The signal emitter assembly 22 should be precisely mounted within the imaging sensor or precisely mounted with respect to the imaging sensor. One method identified for an aircraft installation, mounts the test point generating source, i.e. signal emitter 22, to the imaging sensor 16, and reflects its transmission off an integral window of the aircraft installation back into the imaging sensor 16. This method is useful when space constraints are an issue. Other methods may use a signal emitter 22 which transmits directly into the imaging sensor. However, whichever method is used, the actual position of the test point received onto the imaging sensor 16 must be precisely defined. In FIG. 1, the monitoring image 26 is shown being reflected off of a reflective surface 30. In an aircraft application this reflective surface 30 may be, for example, an internal surface of an external window of the aircraft. Other examples of reflective surfaces, may include, for example, specially placed mirrors or reflective coatings.

Figure 2:
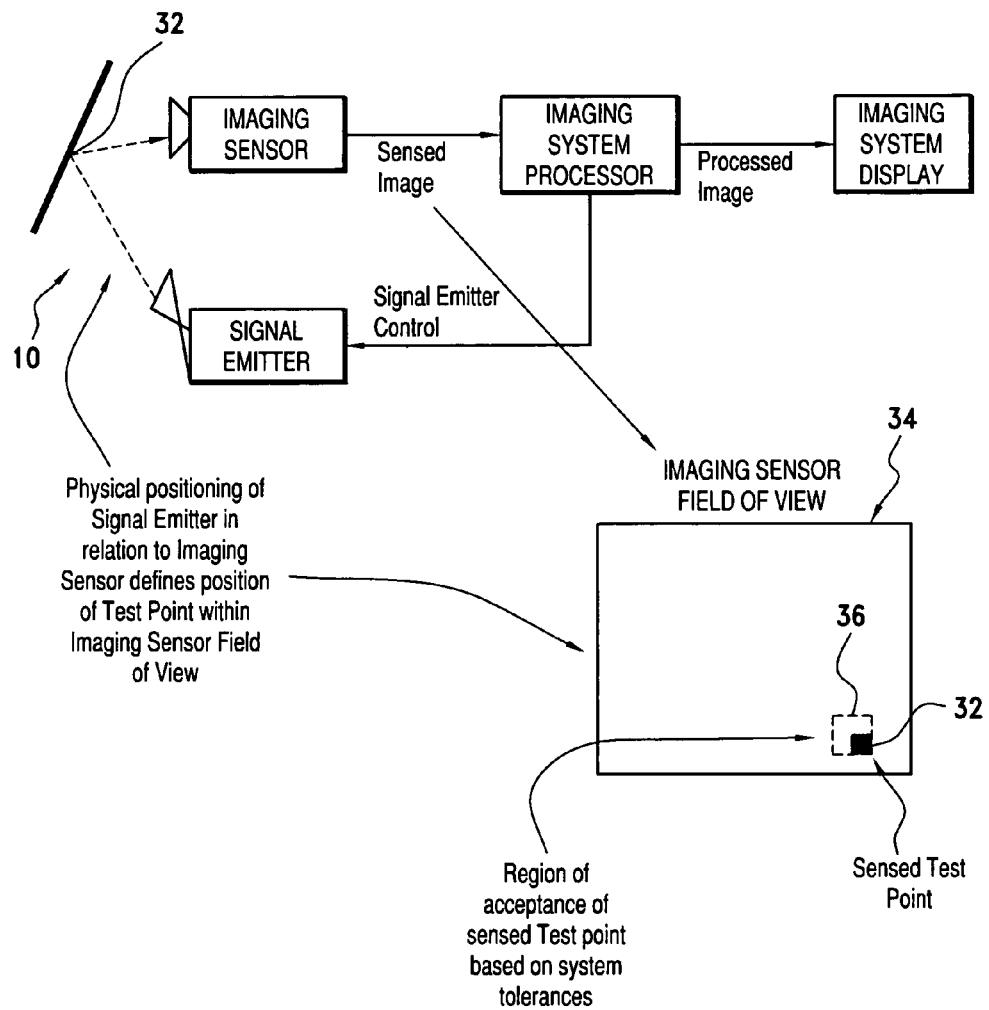
FIG. 2 is a block diagram illustrating the scene imaging/integrity monitoring system with presentation of the monitoring image generated object (test point).

Referring now to FIG. 2, during operation of the scene imaging system/integrity monitoring system 10, the physical positioning of the signal emitter assembly 22 in relation to the imaging sensor 16 defines the position of a test point 32. A pictorial representation (display) of the imaging sensor field of view 34 of the imaging sensor 16 is shown in FIG. 2. The test point (object) must be within field of view 34. The region of acceptance 36 of the sensed test point 32 is based on system tolerances. System tolerances may need to be established due to the precision with which the signal emitter assembly is mounted, the precision with which the imaging sensor is mounted, the size of the test point (object) as it appears in the imaging sensor field of view, and the resolution of the imaging sensor.

In the application of an aircraft SIS, a misplaced or inappropriate sensed test point may be an indication of a misaligned or frozen image of the outside world as presented to the pilot. This type of fault may result in pilot confusion due to the attempted viewing and reference of features within the image which are not representative of the corresponding real world feature. Depending on the operation being performed, faults of this type could result in severe consequences to the aircraft or excessive workload for the pilot.

Figure 3:
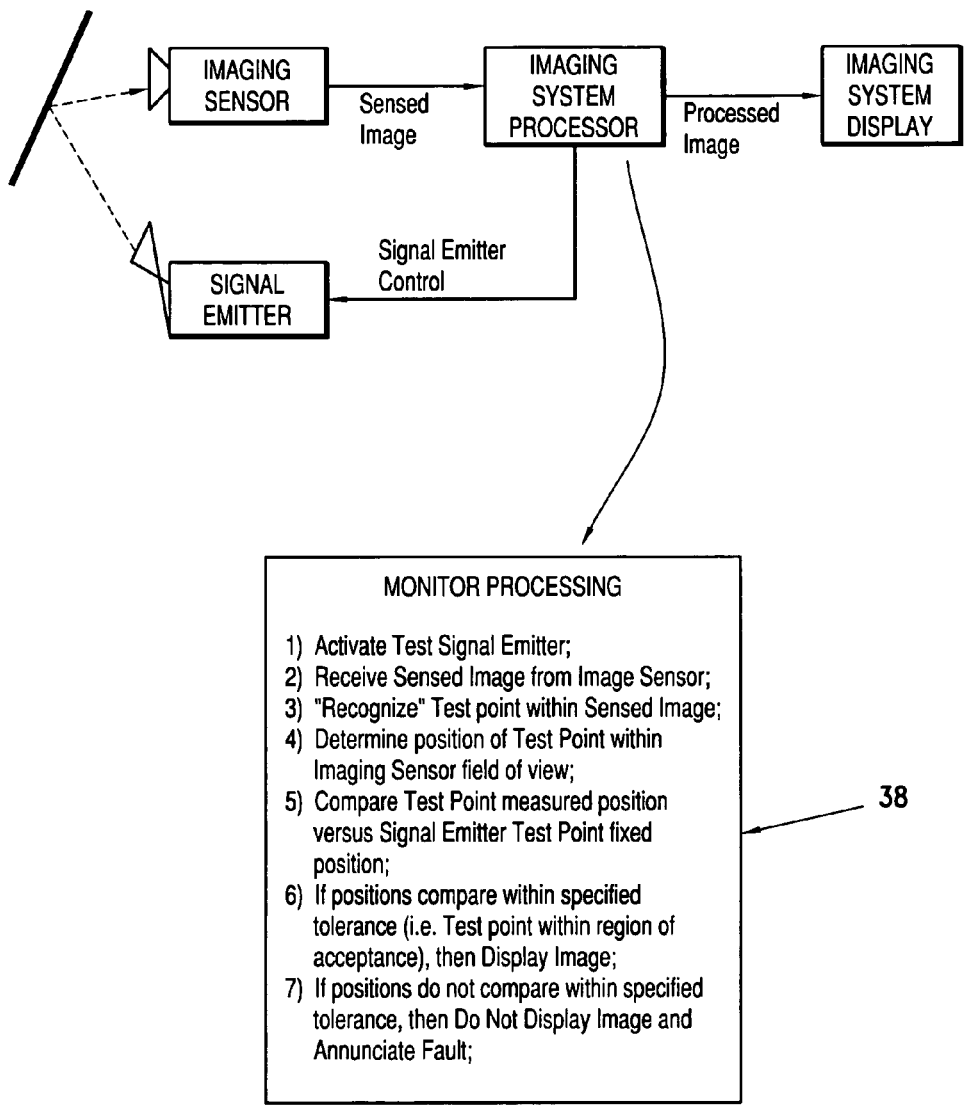
FIG. 3 is a block diagram illustrating the scene imaging/integrity monitoring system with presentation of the imaging system processor's monitor processing.

Referring now to FIG. 3, the methodology for imaging system processing is illustrated, designated generally as 38:

1. The signal emitter assembly 22 is activated to produce the monitor image.

2. The imaging sensor's image is received.

3. The test object is detected and identified within the imaging sensor's entire image.

4. The position of the test object is then measured within the active field of view.

5. The measured position of the test object is compared to a stored position value.

6. If the measured position and the stored position are within specified tolerances, then a signal is provided to the imaging system display 20 to display a processed image.

7. If the measured position and the stored position are not within specified tolerances, then an image is not displayed and instead a fault is indicated. The tolerance allowed between the measured test point and the actual test point is dependent on the application of the imaging sensor. The preciseness of the test point detection function and the test point generation mechanism and its mounting, therefore, is also dependent on the application of the imaging sensor.

An unexpected processed position of the test point could indicate a fault in the sensing and generation of the image within the imaging sensor. The imaging sensor may have been physically damaged or its mounting compromised shifting the field of view of the imaging sensor. Also, internal image sensing functions may have been affected by hardware faults or undiscovered application source (software/firmware) design errors. An unexpected processed position of the test point could also indicate a fault in the processing and display portion of the imaging system processor. The internal image processing functions or internal display functions may also have been affected by hardware faults or undiscovered application source (e.g. firmware, software) design errors. Finally, a fault may be indicated simply due to failure of the internal monitoring functions. In any case, the imaging sensor should indicate a failure has occurred and possibly discontinue operation.

Figure 4:
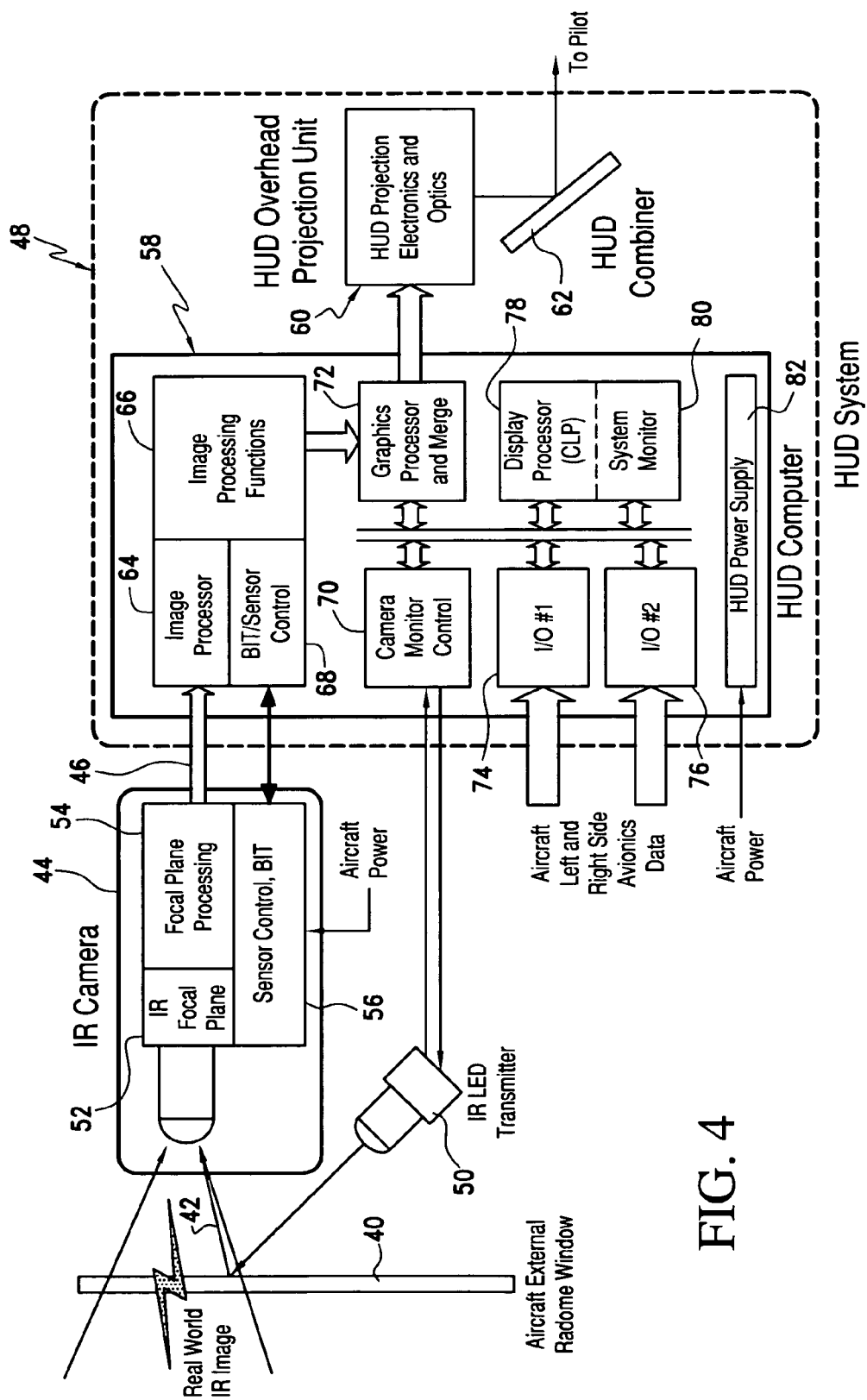
FIG. 4 is a system block diagram of the scene imaging/integrity monitoring system implemented as an infrared based EVS for a Head Up Display (HUD).

Referring now to FIG. 4, integration of the principles of the present invention to an infrared based EVS for a Head Up Display (HUD) is illustrated. In this example, an aircraft external radome window 40 is used to provide the reflected signal 42. An EVS is used having an infrared camera 44 to provide the sensed image 44 to a HUD system, designated generally as 48. An IR LED transmitter 50 serves as the signal emitter assembly.

The IR camera 44 includes an infrared (IR) focal plane 52, appropriate focal plane processing 54, and sensor control and built-in test (BIT) interfaces and processing 56. The focal plane array of the IR Camera 44 senses the real world IR image along with the reflected image of the IR LED transmitter 50. These images are combined and formatted by the focal plane processing 54 and transmitted (via interface 46) to the HUD System 48. Sensor controls are accessible through the HUD System interface as well as any sensor BIT results.

The HUD system 48 includes a HUD computer 58, a projection unit 60 and a HUD combiner 62. The projection unit 60 may be, for example, an overhead projection unit or a unit that is positioned behind the dash. Similarly, the HUD combiner can be one of several types well known in this field. The HUD computer 58 includes an image processor 64 for processing signals from the focal plane processing unit 54 of the IR camera 44, appropriate imaging processing functions 66 and a BIT/Sensor control 68 for communication with the sensor control/BIT 56 of the IR camera 44.

The HUD computer 58 also includes a camera monitor control 70 for interfacing with and activating the IR LED transmitter 50, a graphics processor/merge module 72 for combining the IR image with HUD generated symbology and transmitting the merged display to the HUD Projection Electronics. The HUD computer 58 also includes left and right I/O's 74, 76, for receiving aircraft avionics data, a display processor (CLP) 78 which positions and forms the HUD generated symbology, a system monitor 80 for verifying the position of critical HUD generated symbology and the test point within the IR Sensor generated image, and a HUD power supply 82.

Figure 5:
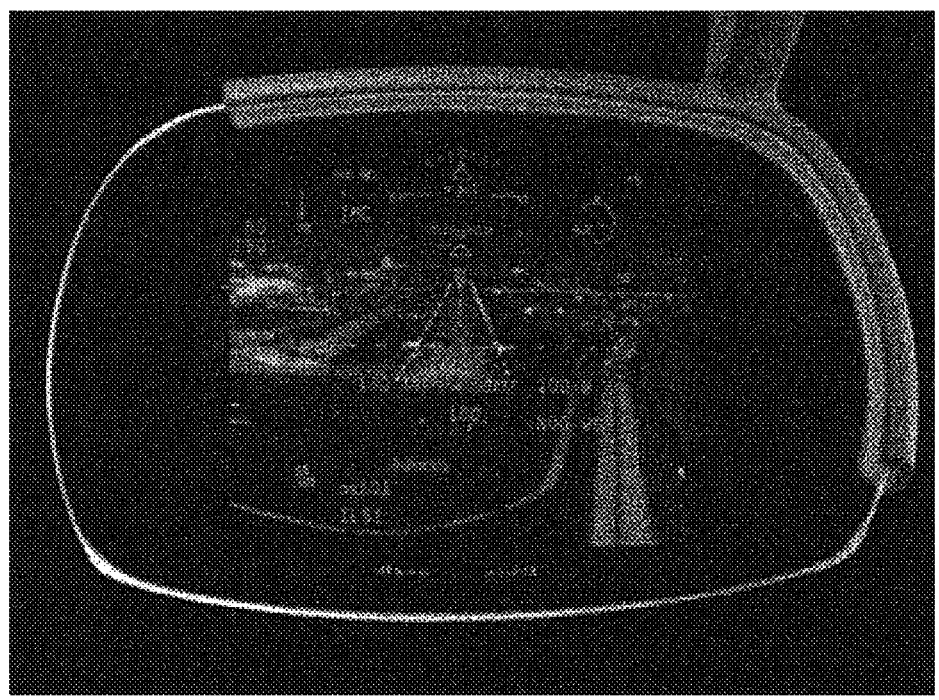
FIG. 5 shows an infrared image on a HUD.

Referring now to FIG. 5, an example of an infrared image merged with HUD generated symbology is presented.

Other embodiments and configurations may be devised without departing from the spirit of the invention and the scope of the appended claims.

The invention claimed is:

1. A scene imaging system (SIS) integrity monitor for monitoring the required operation of an imaging sensor of an SIS, said SIS being of a type comprising: i) an imaging sensor, ii) an imaging system processor, and iii) an imaging system display, said SIS integrity monitor, comprising:
a signal emitter assembly for receiving emitter drive signals from an imaging system processor and directing a monitoring image into the active field of view of an imaging sensor for sensed image generation, the generated image provided to the imaging system processor for analysis, wherein the imaging system processor evaluates the location and modulation state of the generated image to determine if faults exist in the image generation or image display paths, said modulation state being the rate at which said signal emitter assembly is activated and deactivated, said signal emitter operating in a continuous, real-time manner.

2. The SIS integrity monitor of claim 1, wherein said SIS comprises an enhanced vision system (EVS) sensor.

3. The SIS integrity monitor of claim 1, wherein said SIS comprises an enhanced vision system (EVS) sensor comprising a visible light camera and said signal emitter assembly comprises a visible light source.

4. The SIS integrity monitor of claim 1, wherein said SIS comprises an enhanced vision system (EVS) sensor comprising an infrared detector and said signal emitter assembly comprises an infrared source.

5. The SIS integrity monitor of claim 1, wherein said SIS comprises an enhanced vision system (EVS) sensor comprising a millimeter wave detector and said signal emitter assembly comprises a millimeter wave source.

6. The SIS integrity monitor of claim 1, wherein said SIS comprises an enhanced vision system (EVS) sensor of an aircraft, said monitoring image being reflected off a signal reflecting surface of the aircraft into the active field of the EVS sensor.

7. The SIS integrity monitor of claim 1, wherein said SIS comprises an enhanced vision system (EVS) sensor of an aircraft, said monitoring image being reflected off a signal reflecting surface of the aircraft into the active field of the EVS sensor, said signal reflecting surface comprising an internal surface of a window.

8. The SIS integrity monitor of claim 1, wherein said signal emitter assembly is mounted within said imaging sensor.

9. The SIS integrity monitor of claim 1, wherein said signal emitter assembly is precisely mounted relative to said imaging sensor.

10. The SIS integrity monitor of claim 1, wherein said signal emitter assembly directs said monitoring image directly into the imaging sensor.

11. The SIS Integrity monitor of claim 1, wherein said imaging system processor measures an object's position within an image after the object has been detected and identified, said object's position being compared against a stored position value representing where the object should have appeared in the imaging sensor's entire image.

12. The SIS integrity monitor of claim 1, wherein said imaging system processor measures an object's position within an image after the object has been detected and identified, said object's position being compared against a stored position value representing where the object should have appeared in the imaging sensor's entire image, said imaging system processor operating by the steps of:
a) activating said signal emitter assembly to produce said monitoring image;
b) receiving a sensed image from said imaging sensor,
c) detecting and identifying a test object within said imaging sensor's image;
d) measuring a position of said test object within said active field of view;
e) comparing said measured position of said test object versus a stored position value, wherein:
i. if said measured position and said stored position are within specified tolerances, then a signal is provided to said imaging system display to display a processed image; and,
ii. if said measured position and said stored position are not within specified tolerances, then an image is not displayed and instead a fault is indicated.

13. A scene imaging/integrity monitoring (SI/IM) system, comprising:
a) a scene imaging system (SIS), comprising:
i. an imaging sensor having an active field of view for sensing an image and providing a generated image;
ii. an imaging system processor operatively connectable to said imaging sensor for analyzing said generated image; and,
iii. an imaging system display operatively connected to said imaging system processor for receiving the processed image and displaying said generated image; and,
b) a scene imaging system (SIS) integrity monitor, comprising:
a signal emitter assembly for receiving emitter drive signals from said imaging system processor and directing a monitoring image into said active field of view of said imaging sensor for sensed image generation, the generated image provided to said imaging system processor for analysis, wherein said imaging system processor evaluates the location and modulation state of the generated image to determine if faults exist in the image generation or image display paths, said modulation state being the rate at which said signal emitter assembly is activated and deactivated, said signal emitter operating in a continuous, real-time manner.

14. The scene imaging/integrity monitoring (SI/IM) system of claim 13, wherein said SIS comprises an enhanced vision system (EVS) sensor.

15. The scene imaging/integrity monitoring (SI/IM) system of claim 13, wherein said SIS comprises an enhanced vision system (EVS) sensor comprising an infrared detector and said signal emitter assembly comprises an infrared source.

16. A method for monitoring the operation of an imaging sensor of a scene imaging system (SIS), comprising the steps of:
a) utilizing a monitor externally positioned relative to an imaging sensor for generating a test point at a desired location within a field of view of the imaging sensor in a continuous, real-time manner;

b) utilizing said imaging sensor for sensing said test point and processing the position of said test point; and, c) comparing said position of said test point against an expected position to verify the correct operation of said imaging sensor.

17. The method of claim 16, wherein said step of utilizing said monitor comprises utilizing a signal emitter assembly for receiving emitter drive signals from an imaging system processor and directing a monitoring image into said active field of view of said imaging sensor for sensed Image generation, the generated image provided to said imaging system processor for analysis, wherein said imaging system processor evaluates the location and modulation state of the generated image to determine if faults exist in the image generation or image display paths.

18. The method of claim 16, wherein said step of utilizing said imaging sensor, comprises utilizing an enhanced vision system (EVS) sensor.

19. The method of claim 16, wherein said step of utilizing said imaging sensor, comprises utilizing an enhanced vision system (EVS) sensor comprising an infrared detector.

20. The method of claim 16, wherein said step of utilizing a monitor, comprises utilizing a signal emitter assembly comprising an infrared source.

* * * * *